US006703996B2

(12) United States Patent
Janssen et al.

(10) Patent No.: US 6,703,996 B2
(45) Date of Patent: Mar. 9, 2004

(54) DEVICE AND METHOD FOR ADDRESSING LCD PIXELS

(75) Inventors: Peter J. Janssen, Scarborough, NY (US); Lucian R. Albu, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 266 days.

(21) Appl. No.: 09/877,426

(22) Filed: Jun. 8, 2001

(65) Prior Publication Data

US 2002/0186190 A1 Dec. 12, 2002

(51) Int. Cl.[7] ........................... G09G 3/36; G02F 1/136
(52) U.S. Cl. ............................. 345/92; 349/42; 349/48
(58) Field of Search ...................... 345/87, 92; 349/42, 349/48

(56) References Cited

U.S. PATENT DOCUMENTS 3,765,747 A * 10/1973 Pankratz et al. ........... 349/160
4,239,346 A 12/1980 Lloyd
5,056,895 A 10/1991 Kahn
5,351,145 A * 9/1994 Miyata et al. ................ 349/48
5,742,270 A * 4/1998 Kuo ........................... 345/100
5,990,988 A * 11/1999 Hanihara et al. ............. 349/48
6,031,513 A 2/2000 Ikeda .......................... 345/92
6,057,897 A * 5/2000 Ichikawa et al. ............. 349/48
6,195,139 B1 * 2/2001 Yamazaki et al. ............ 349/43
6,545,655 B1 * 4/2003 Fujikawa ..................... 345/87

OTHER PUBLICATIONS

Sei Saitoh et al: "Present Status And Future of Driver LSI" Electronics & Communications In Japan, Part II—Electronics, Scripta Technica. New York, US, vol. 76, No. 12, Dec. 1, 1993, pp. 31–39.

* cited by examiner

Primary Examiner—Richard Hjerpe
Assistant Examiner—M. Fatahiyar

(57) ABSTRACT

An electro-optic device comprising a matrix array of an LCD display element, the device having shared-source adjacent transistors in contiguous rows, thereby reducing the capacitive loading on drivers providing voltage signals which modulate the display elements. In addition, a method is provided for utilizing a matrix design that incorporates non-contiguous, multi-row addressing and shared-source transistors. The device and method provide a display device with large pixel count, yet with high display definition and performance.

14 Claims, 3 Drawing Sheets

DEVICE AND METHOD FOR ADDRESSING LCD PIXELS

FIELD OF THE INVENTION

The present invention relates to the field of electro-optic display devices. More specifically, the present invention relates to active matrix liquid crystal displays which are multi-row addressable.

BACKGROUND OF THE INVENTION

LCD devices used in such applications as high definition television are known to those skilled in the art. Examples of such devices, and in particular active matrix display devices, are provided by U.S. Pat. Nos. 4,239,346 and 5,056,895. In the interest of brevity, familiarity with these devices is assumed and the aforementioned patents are incorporated herein by reference in their entirety.

In modern uses of LCD devices, such as high definition television, there is an increasing need for greater display definition and performance. One way of increasing definition is to increase the number of pixel elements within a constant display area. However, increasing the number of elements in a prior art device tends to degrade the performance of the display.

One reason this degradation occurs is that adding pixels decreases the available scanning transfer time $T_a$ for a row of elements, in a row-by-row scanning sequence, relative to the time needed to scan the entire matrix. Unfortunately, because pixels are connected to storage capacitors, $C_{pix}$, which require some time to fully charge, any reduction in $T_a$ can degrade display performance.

Another reason is that adding pixel elements increases the total capacitive load seen by a column driver driving the pixel elements. In a typical LCD matrix array using transistors switches, a column driver is electrically connected to each transistor source, s, and associated substrate capacitance, $C_s$, within a column of the array. Therefore a column driver sees $C_{pix}$, the storage capacitor of a target pixel, as well as all $C_s$ capacitors located in a column in a parallel combination. The combination of all $C_s$ capacitors is substantial relative to the value of a single $C_{pix}$. The charging speed for the pixel capacitor, $C_{pix}$, may be slowed if the numbers of $C_s$ capacitors within a column increases. Thus, adding pixels not only reduces the available scanning transfer time, $T_a$, but compounds the problem by increasing the capacitive load seen by a column driver. Both effects can combine to slow the transfer of a voltage signal to an LCD pixel.

In view of current applications requiring high display definition and high pixel count, it would be desirable to provide an array display device that reduces capacitive load seen by a column driver, and moreover, a method to increase scanning time, $T_a$, and thereby improve display performance.

SUMMARY OF THE INVENTION

One aspect of the invention provides an electro-optical display device which may include: an M row by N column matrix array of display elements; a plurality of pairs of transistor switches including a shared source, the source operably connected to the plurality of pairs of display elements, wherein the two elements are separately located in adjacent rows; a plurality of driving connectors operably connected to a plurality of Q non-contiguous rows of display elements; and a plurality of switch connectors operably connected to Q non-contiguous rows of display elements to allow electrical connection with driving signals from column drivers. Q can be a whole number 2 or greater. Sharing the transistors sources can eliminate one-half of substrate capacitance, $C_s$ and the plurality of switch connectors allows concurrent, multi-row addressing of non-contiguous rows of elements.

In addition, the display device may include means to produce switching signals, such as row drivers, which enable a connection between a transistor source and the pixel storage capacitor, $C_{pix}$. And further, the device may include means for producing driving signals, such as column drivers having A/D converters that output analog voltage signals which charge $C_{pix}$ and modulate light in the LCD pixel element.

In a preferred embodiment, each of M row drivers may be electrically connected to Q number of non-contiguous rows of transistors gates, and each of N column drivers may be electrically connected to M/Q*2 rows of transistor sources.

Another aspect of the invention provides a method of addressing an array of M by N display elements. The method can include: providing paired transistors, which act as switches to the display elements, the paired transistors sharing a source, and wherein the paired transistors are in contiguous rows; delivering Q number of concurrent enabling switching signals to Q rows of elements through electrical connections, wherein the rows of elements are non-contiguous; delivering independent signals to each enabled element in the non-contiguous rows; and transferring the signals to each enabled display element to modulate light. The method may further include: successively repeating the above steps to other groups of Q non-contiguous rows having elements not yet enabled, until the entire array has been addressed so that each element is enabled at least once. Q can be selected as a whole number two or greater.

BRIEF DESCRIPTION OF THE PRESENTLY PREFERRED EMBODIMENTS

Figure 1:
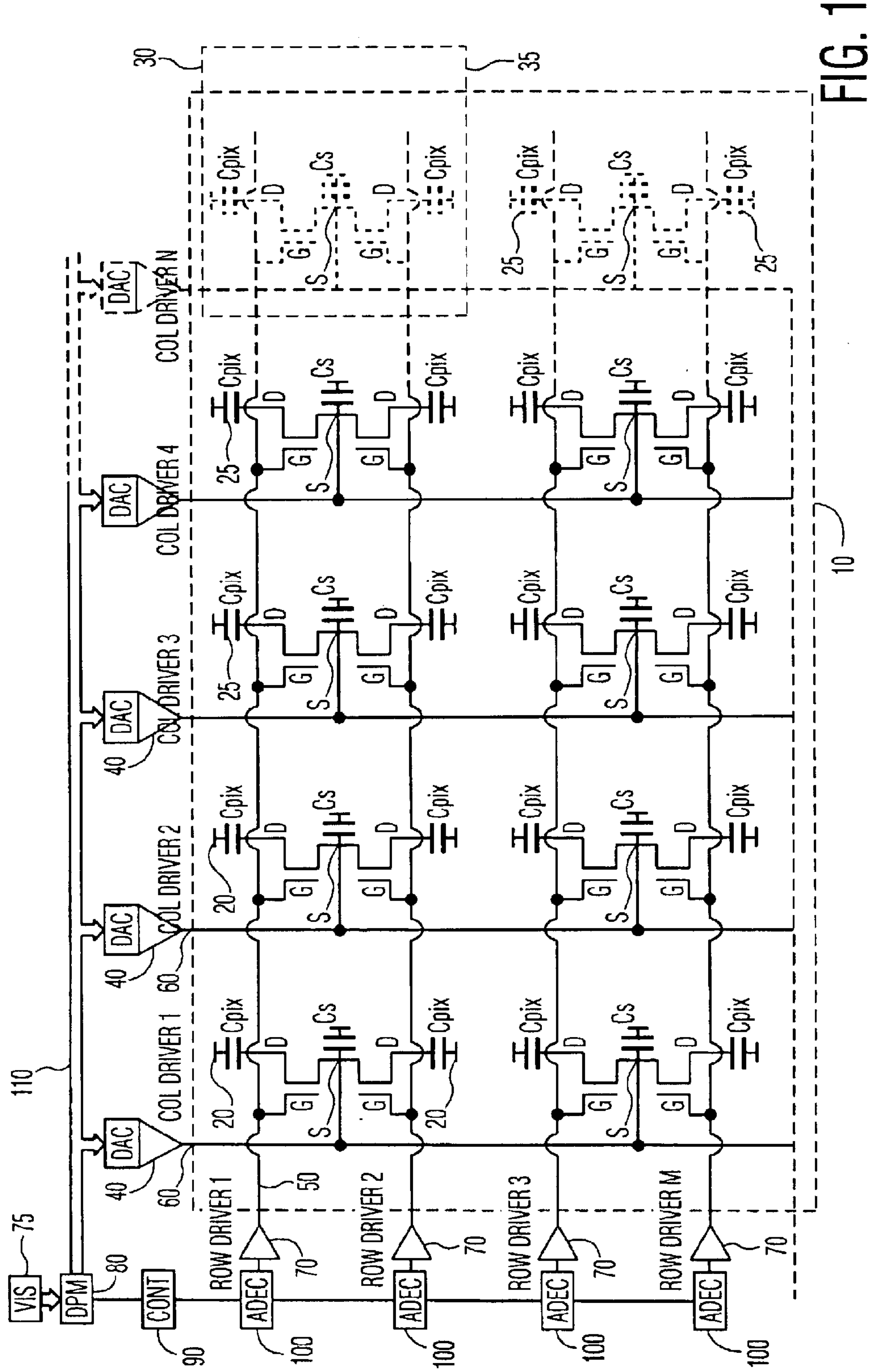
FIG. 1 is a schematic diagram of one embodiment of an active matrix liquid crystal display (AMLCD) device having shared-source transistors in contiguous rows.

FIG. 1 depicts a schematic diagram of an AMLCD device having shared-source transistors in contiguous rows of the display array. The array panel 10 includes M rows and N columns of display elements 20. Each display element, representing one pixel of the panel, can be connected to an IGFETS transistor 30 or 35, which acts as a switching element. Adjacent, paired transistors in contiguous rows (1,2), (3,4) . . . (M−1, M) share a source, s. The transistor source, s, can be electrically connected to the output of a column driver 40, via electrodes 60.

In a conventional array panel where transistors do not share a source (panel not shown), a column driver sees a load represented by a parallel combination of all $C_s$ capacitors in one column of transistors. These $C_s$ capacitances, as well as auxiliary capacitances (not shown), provide significant capacitive loading which reduces the speed at which a target $C_{pix}$ can be charged. The shared-source transistor arrangement shown in FIG. 1, however, cuts the number of $C_s$ capacitors in a column by one-half.

In FIG. 1, row driver 70 can be connected to output electrode 50, which in turn can be connected to gate, G, of every transistor in a particular row. The transistor drain, D, can be connected to $C_{pix}$, 25. The pixel 20, which may be an LCD, can modulate light as various voltages are applied across $C_{pix}$.

In operation one frame of video information can be generated by a video source ("VI") 75. This frame of analog information can be converted to a digital form and stored in digital picture memory ("DP") 80. To transfer the video frame information in the picture memory to the LCD pixels, the controller circuit ("CONT") 90 can enable address decoder ("ADEC") 100 for row driver 1. This switches on all transistors in row 1 such that each LCD pixel 20 in that row can accept a voltage signal from its respective column driver 40. With row 1 enabled, the controller can instruct the picture memory to transfer the video data for the entire row 1 through the data bus 110 which connects to each of the column drivers 40. The digital data can be stored in the column drivers 1 to N and converted into analog data voltages.

Then, the analog voltages can be delivered to each $C_{pix}$ 25 within row 1. Next, the controller 90 can turn off all transistor switches 30 in row 1 and also turn on all transistor switches 35 in row 2. However, although the transistors in row 1 are switched off, the images already delivered to the pixels 20 in row 1 persist because the voltages are maintained by each respective pixel capacitor, $C_{pix}$, and any auxiliary storage capacitance (not shown). Hence, the rows of transistors can be sequentially addressed from row 1 to row M, providing row-by-row scanning for the entire LCD matrix array. A completed scan of the entire M by N array thus can represent one frame of video information. Subsequent frames of video information can be displayed by the LCD device by re-addressing rows 1 through M.

Figure 2:
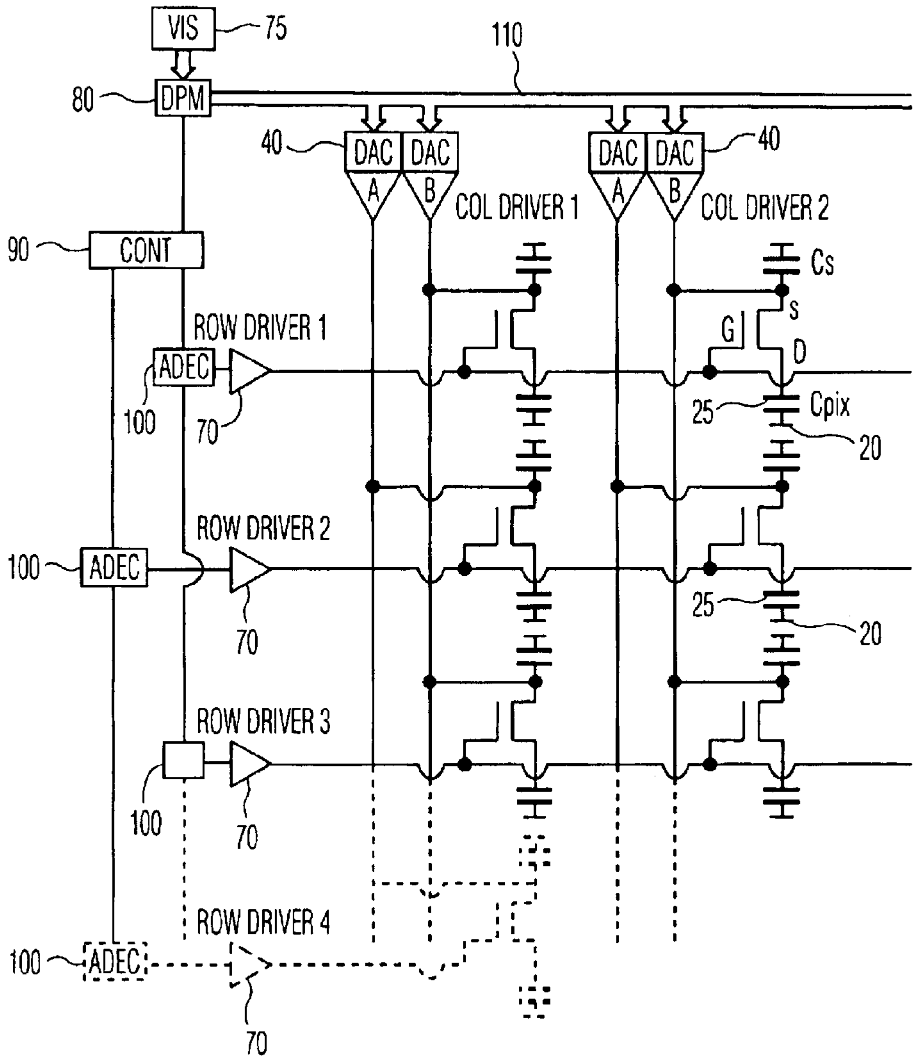
FIG. 2 is a schematic diagram of one embodiment of an AMLCD device having double the number of column drivers and a multi-row addressing scheme.

FIG. 2 depicts a schematic diagram of another AMLCD device. Instead of row-by-row addressing, this AMLCD device employs concurrent, multi-row addressing. Additionally, the device in FIG. 2 does not use shared-source transistors. In FIG. 2, contiguous row pairs (1,2), (3,4) . . . (M−1, M) can be switched on or "enabled" concurrently. To permit multi-row addressing, the device employs double the number of column drivers 40. Each column driver 40 may be composed of two separate column sub-drivers, A and B, which divide up the addressing load within a single column.

In operation, rows (1,2) can be switched on concurrently. Next, rows (3,4) can be switched on, then (5,6), and so forth, until the final rows (M−1, M) are switched on. Both column sub-drivers A and B can transfer unique voltage signals simultaneously to their enabled, target pixel elements. Thus, an application of multi-row addressing as described for the device in FIG. 2, requires concurrently addressing paired, contiguous rows. While FIG. 2 shows a device that addresses two rows concurrently, multi-row addressing may be accomplished by concurrently addressing, three, four or more rows at a time.

Figure 3:
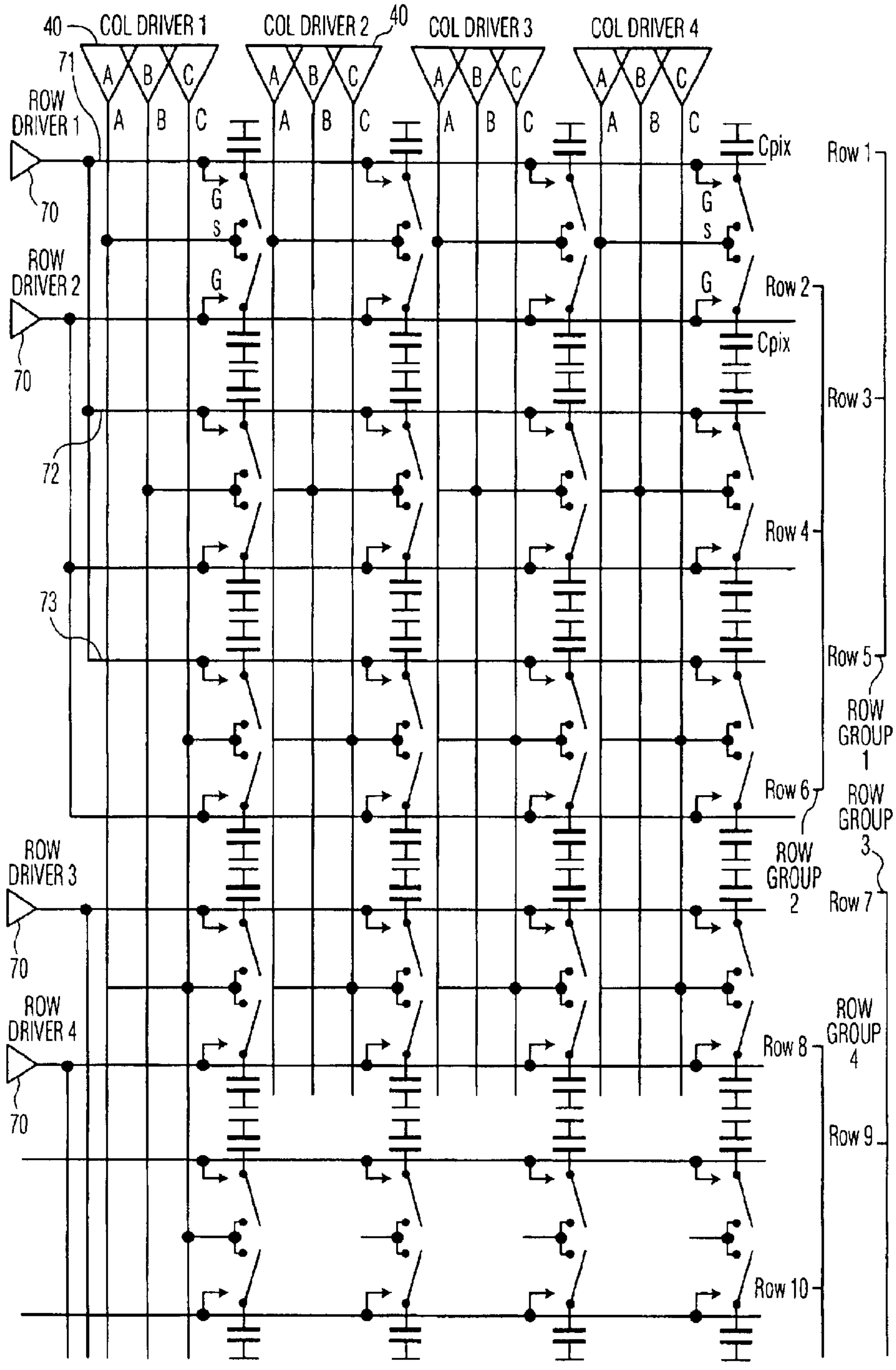
FIG. 3 is a schematic diagram of one embodiment of an AMLCD device in accordance with the present invention.

FIG. 3 provides an exemplary embodiment of an M by N matrix display in accordance with the invention, combining shared-source transistors 30, 35 and multi-row addressing of non-contiguous rows. The transistors can be IGFETS and the display elements can be LCDs. In this embodiment there are N column drivers 40 and three column sub-drivers, A, B, and C, composing each column driver. Each sub-driver can be attached to the source, s, of paired transistors.

Enabling signals can be generated by row drivers 70, each driver having multiple output connections 71, 72, and 73, which connect to gates G of respective target transistor rows. In this example, a row driver connects only to non-contiguous rows and the number of output connections of a row driver, which is three, equals the number of column sub-drivers as represented by A, B and C.

In the exemplary device shown in FIG. 3, transistors in paired rows (1,2), (3,4), (5,6) . . . (M−1, M) share a common source, s. Column sub-driver A can be connected to the common source for transistors of paired rows (1,2), (11,12), (13,14), (23,24) . . . ; sub-driver B can be connected to the source for transistors of paired rows (3,4), (9,10), (15,16), (21,22) . . . ; and sub-driver C can be connected to the source for transistors of paired rows (5,6), (7,8), (17,18), (19,20) . . . Row driver 1 connects to the gates G of transistors of rows (1,3,5); row driver 2 connects to rows (2,4,6); row driver 3 connects to rows (7,9,11); and row driver 4 connects to rows (8,10,12).

In operation, multi-row addressing is employed by sequentially addressing each row driver 1, 2, 3 . . . M. In other words, in the first $T_a$, rows (1,3,5) may be concurrently enabled in the next $T_a$, rows (2,4,6) can be concurrently enabled, and in the next $T_a$, rows (7,9,11) can be enabled, and so forth, until all rows in the display matrix have been addressed and enabled.

It will be appreciated by one skilled in the art that application of this multi-row addressing method may be employed with other devices having shared-source transistors, other than as shown in the exemplary device of FIG. 3. If Q represents the number of rows addressed concurrently, Q may also represent the number of column sub-drivers. FIG. 3 represents an exemplary case where Q equals three.

In accordance with the present invention, it is possible to construct other embodiments of an M by N matrix array having Q other than three. In general Q must be a whole number two or greater, the selection of Q is dependent solely on the available integration technologies and the size of the desired LCD device. The display device can include a matrix array having shared-source transistors in contiguous rows in combination with multi-row addressing. In the case where Q is three, the number of output connections for each column driver 1 through N may be represented as M/2, and thus, the number of output connections for a sub-driver can be M/6. Generally, each of M row drivers can be electrically connected to Q number of non-contiguous rows of transistors gates, and each of N column drivers can be electrically connected to M/Q*2 rows of transistor sources.

The result of the method of the present invention employing simultaneous, multi-row addressing is to increase the available scanning time $T_a$ for a row. In particular, for Q number of column sub-drivers, and each row driver having Q row connections, the scanning time, $T_a$, for each row can be extended according to $T_a$=(total frame time)/M*Q. Thus, multi-row addressing can increase the available scanning time for a single row, thereby improving display performance. An attendant benefit of the invention is that each column sub-driver sees N/Q*2 number of Cs capacitors and, thus, the overall capacitive load can be reduced, improving display performance. The present invention, thus described, may permit high pixel count, while maintaining high display performance.

Another embodiment of the method of addressing, however, goes further by employing a "pre-write" strategy. Referring again to FIG. 3, this addressing method can be as follows. In the first $T_a$, row drivers 1, 2, and 3 are turned on concurrently. This enables rows (1,3,5), (2,4,6) and (7,9,11), respectively and allows signals to be received from the column drivers. The column sub-drivers, A, B, and C, may then provide voltage signals meant for rows (1,3,5) of the array. Note that the other enabled rows (2,4,6), (7,9,11) also receive the same voltage information in this first step, but only for the purpose of "pre-writing".

In the second $T_a$, row driver 1 can be switched off, while row drivers 2 and 3 remain switched on, and row driver 4 can also be switched on concurrently. The column drivers then provide voltage signals meant for rows (2,4,6). Again, rows (7,9,11) connected to row driver 3 and rows (8,10,12) connected to row driver 4 can receive pre-write data. In the next $T_a$, row drivers 1 and 2 can be turned off and row drivers 3, 4 and 5 can be switched on. This pattern is repeated for the entire array until one frame is completed. Pre-writing can reduce cross-talk between source-sharing transistors, which are in contiguous rows and thus can eliminate row-based artifacts.

The invention has been described in terms of exemplary embodiments. The invention, however, is not limited to the embodiments depicted and described and it is contemplated that other embodiments, which may be readily devised by persons of ordinary skilled in the art based on the teachings set forth herein, are within the scope of the invention.

What is claimed is:

1. An electro-optical display device, comprising:
- a column of display elements;
- a column driver;
- a plurality of row drivers;
- a first pair of transistor switches including
  - a first shared transistor source connected to said column driver,
  - a first transistor gate connected to a first row driver of said plurality of row drivers,
  - a second transistor gate connected to a second row driver of said plurality of row drivers,
  - a first transistor drain connected to a first display element of said column of display elements, and
  - a second transistor drain connected to a second display element of said column of display elements; and
- a second pair of transistor switches contiguous with said first pair of transistor switches, said second pair of transistor switches including
  - a second shared transistor source connected to said column driver,
  - a third transistor gate connected to a third row driver of said plurality of row drivers,
  - a fourth transistor gate connected to a fourth row driver of said plurality of row drivers,
  - a third transistor drain connected to a third display element of said column of display elements, and
  - a fourth transistor drain connected to a fourth display element of said column of display elements.

2. The display device of claim 1, wherein said transistor switches are IGFETS.

3. The display device of claim 1, wherein said display elements are LCDs.

4. The display device of claim 1, wherein said first pair of transistor switches and said second pair of transistor switches are sequentially addressed.

5. An electro-optical display device, comprising:
- a column of display elements;
- a column of column drivers including a first column driver and a second column driver;
- a plurality of row drivers;
- a first transistor switch including
  - a first transistor source connected to said first column driver,
  - a first transistor gate connected to a first row driver of said plurality of row drivers, and
  - a first transistor drain connected to a first display element of said column of display elements; and
- a second transistor switch contiguous to said first transistor switch, said second transistor switch including
  - a second transistor source connected to said second column driver,
  - a second transistor gate connected to a second row driver of said plurality of row drivers, and
  - a second transistor drain connected to a second display element of said column of display elements.

6. The display device of claim 5, further comprising:
- a third transistor switch including
  - a third transistor source connected to said first column driver,
  - a third transistor gate connected to a third row driver of said plurality of row drivers, and
  - a third transistor drain connected to a third display element of said third column of display elements; and
- a fourth transistor switch contiguous to said third transistor switch, said fourth transistor switch including
  - a fourth transistor source connected to said second column driver,
- a fourth transistor gate connected to a fourth row driver of said plurality of row drivers, and
- a fourth transistor drain connected to a fourth display element of said third column of display elements.

7. The display device of claim 5, wherein said transistor switches are IGFETS.

8. The display device of claim 5, wherein said display elements are LCDs.

9. The display device of claim 5, wherein said first transistor switch and said second transistor switch are concurrently addressed.

10. The display device of claim 6,
- wherein said first transistor switch and said second transistor switch are concurrently addressed; and
- wherein said third transistor switch and said fourth transistor switch are concurrently addressed.

11. An electro-optical display device, comprising:
- a column of display elements;
- a column of column drivers including a first cohimn driver and a second column driver;
- a plurality of row drivers;
- a first pair of transistor switches including
  - a first shared transistor source connected to said first column driver,
  - a first transistor gate connected to a first row driver of said plurality of row drivers,
  - a second transistor gate connected to a second row driver of said plurality of row drivers,
  - a first transistor drain connected to a first display element of said column of display elements, and
  - a second transistor drain connected to a second display element of said column of display elements; and
- a second pair of transistor switches contiguous with said first pair of transistor switches, said second pair of transistor switches including
  - a second shared transistor source connected to said second column driver, a third transistor gate connected to said first row driver of said plurality of row drivers, a fourth transistor gate connected to said second row driver of said plurality of row drivers, a third transistor drain connected to a third display element of said column of display elements, and a fourth transistor drain connected to a fourth display element of said column of display elements.

12. The display device of claim 11, wherein said transistor switches are IGFETS.

13. The display device of claim 11, wherein said display elements are LCDs.

14. The display device of claim 11, wherein said first transistor gate and said third transistor gate are concurrently addressed; and wherein said second transistor gate and said fourth transistor gate are concurrently addressed.

* * * * *